(12) United States Patent
Cox et al.

(10) Patent No.: US 7,084,759 B2
(45) Date of Patent: Aug. 1, 2006

(54) DROP DETECTION DEVICE

(75) Inventors: Allen Cox, Eastleigh (GB); Neil Morris, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 10/487,806

(22) PCT Filed: Jul. 19, 2002

(86) PCT No.: PCT/GB02/03325

§ 371 (c)(1),
(2), (4) Date: Feb. 26, 2004

(87) PCT Pub. No.: WO03/021219

PCT Pub. Date: Mar. 13, 2003

(65) Prior Publication Data

US 2004/0201484 A1    Oct. 14, 2004

(30) Foreign Application Priority Data

Aug. 31, 2001  (GB)  ................................. 0121067.3

(51) Int. Cl.
*G08B 21/00*    (2006.01)

(52) U.S. Cl. ..................... 340/540; 340/665; 340/545.5

(58) Field of Classification Search ................. 340/540
See application file for complete search history.

(56) References Cited

U.S. PATENT DOCUMENTS

| | | | | |
|---|---|---|---|---|
| 4,234,876 | A | * | 11/1980 | Murai ...................... 340/573.3 |
| 5,134,255 | A | * | 7/1992 | Tetrault et al. ....... 200/61.45 R |
| 5,217,252 | A | | 6/1993 | Kawaguchi et al. |
| 5,398,964 | A | * | 3/1995 | Yamamoto .................. 280/734 |
| 5,596,382 | A | * | 1/1997 | Bamford ..................... 396/429 |
| 5,670,764 | A | * | 9/1997 | Sakamoto et al. .... 200/61.45 R |
| 5,760,313 | A | * | 6/1998 | Guentner et al. ....... 73/862.584 |

FOREIGN PATENT DOCUMENTS

| | | |
|---|---|---|
| FR | 2 535 984 A1 | 5/1984 |
| JP | 60 244863 A | 12/1985 |
| JP | 11 326364 A | 2/2000 |

* cited by examiner

*Primary Examiner*—Jeffery Hofsass
*Assistant Examiner*—Eric Blount
(74) *Attorney, Agent, or Firm*—Jean M. Barkley; Dillon & Yudell LLP

(57) ABSTRACT

A drop detection device having a spherical inertia member disposed within an enclosure. The enclosure has multiple faces, preferably six faces oriented orthogonally, with each face having a pressure contact member. The exertion of a predetermined force by the spherical inertia member on the pressure contact member causes a signal to be activated. Multiple enclosures maybe disposed in different orientations in a housing of a fragile product to provide a signal if the product is dropped in any one of multiple directions.

16 Claims, 3 Drawing Sheets

DROP DETECTION DEVICE

PRIORITY CLAIM

This application is a 371 of PCT/GB02/03325 filed Jul. 19, 2002 which claims the priority of United Kingdom Patent Application No. 0121067.3 filed Aug. 31, 2001.

BACKGROUND OF THE INVENTION

1. Technical Field

This invention relates to a drop detection device. In particular, it relates to a device for use in relation to a product or package that has a fragility requirement that needs to be monitored. Still more particularly, the device detects whether the product or package has been dropped or impacted by another object.

2. Description of the Related Art

Certain materials and devices can be damaged if dropped. For example, dropping or hitting a hard disk drive with sufficient force can result in components of the hard disk drive being damaged. However, the damage may not be evident, either by looking at the exterior case of the hard drive, or even by opening up the case and physically examining the drive's components. Nonetheless, when put into operation, the drive may not function properly due to being dropped. That is, the external shock can cause a disk within the disk drive to slip resulting in inaccurate data recording or increased access times.

To detect whether a device or material has been dropped, different devices have been developed in the past. For example, acceleration limit switches are known in which a spherical inertia body made of ferromagnetic material is maintained in a resting position by a permanent magnet. On the opposite side of the spherical body to the magnet a flexible conducting diaphragm is disposed beyond which is a printed circuit board. If the spherical body is accelerated away from the permanent magnet, it will impact the diaphragm, which is flexible, and the diaphragm will deform to contact an element on the printed circuit board causing some form of signal to be activated.

Acceleration limit switches of this type have the disadvantage that they are only sensitive to acceleration in a single direction. Other forms of drop detection device may include fragile destructive assemblies or high technology accelerometers.

What is needed, therefore, is a multi-directional drop detector that is able to detect and provide an indication signal of a drop event that has been inflicted on a hard disk drive or other impact sensitive equipment or material.

SUMMARY OF THE INVENTION

It is an aim of the present invention to provide a low cost robust assembly that can be used in any product that requires detection of whether it has been dropped or impacted by another object. It is a further aim to provide a drop detection device that detects a drop or impact in any direction or orientation of the product in which the device is provided.

According to a first aspect of the present invention there is provided a drop detection device having a spherical inertia member disposed in an enclosure, the enclosure having a plurality of faces, each face having a pressure contact member, wherein a predetermined force exerted by the spherical inertia member on one of the pressure contact members causes a signal to be activated.

Preferably, the pressure contact members are formed of a deformable diaphragm spaced from a contact member, wherein the predetermined force deforms the diaphragm to contact the contact member.

The predetermined force may be determined by the mass of the spherical inertia member. The predetermined force may be determined by the flexibility of the diaphragm and the distance between the diaphragm and the contact member.

In a rest position or during normal motion, the spherical inertia member may rest in contact with the contact pressure members on the faces and may exert a force of less than the predetermined force on the pressure contact members.

The drop detection device preferably includes first and second enclosures in the form of cubes, the second enclosure being adjacent and oriented differently to the first enclosure. The provision of two or more enclosures oriented differently to each other provides coverage of drop or impact detection in a wider range of directions approximating to 360°.

The enclosure or enclosures may be formed by two molded halves of a housing.

The spherical inertia member may be calibrated to a predetermined mass in relation to the required sensitivity of the drop detection device.

The pressure contact members may use pressure contact keyboard type technology.

The signal that is activated is an LED, an audible alarm or other signal means. The signal means may be disposed on the outside of a packaging or object.

The drop detection device may be formed in the molding of a computer product. The drop detection device may be a self-contained assembly or may be molded into packaging for products.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF ILLUSTRATIVE EMBODIMENT(S)

Figure 1A:
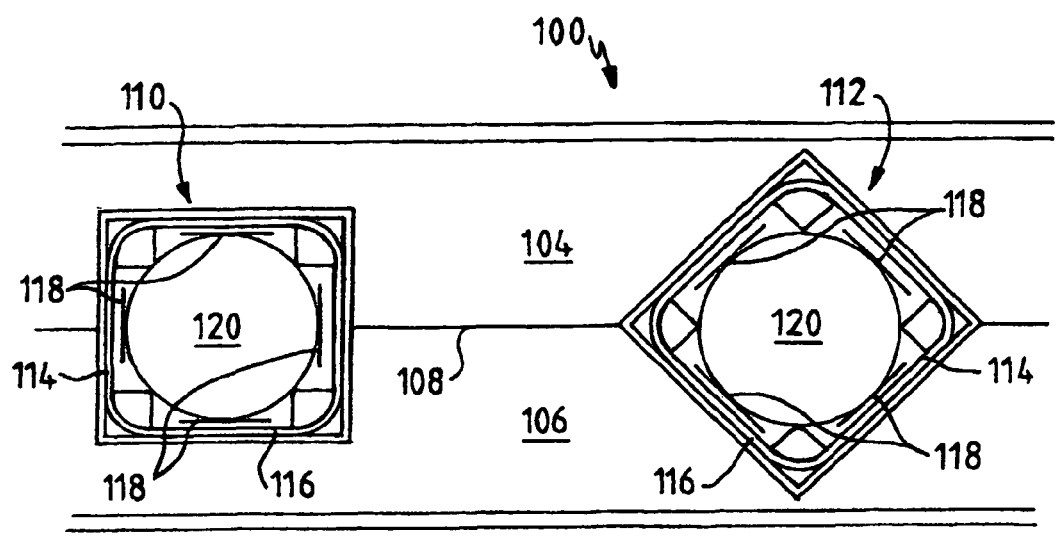
FIG. 1A is a cross-sectional view of a drop detection device in accordance with a preferred embodiment of the present invention.

Referring now to FIG. 1A, a drop detection device 100 is provided in a molded housing 102. The molded housing 102 can be formed as part of a product or incorporated in packaging in order to be part of or in close proximity to a fragile object. For example, the drop detection device 100 can be formed integrally in a molded cassette of a computer hard drive in a laptop computer in order to detect if the computer has been dropped or impacted in some way.

Alternatively, the molding can form a self-contained drop detection item for use as a shipping or packaging monitor, for example, on shipping containers.

The molded housing 102 is formed in two halves 104, 106 with a mold split line 108. Two cavities 110, 112 are formed with half of each cavity 110, 112 molded into each of the two halves 104, 106 of the molded housing 102. When the two halves 104, 106 of the molded housing 102 are placed together, the cavities 110, 112 are completely enclosed within the molded housing 102.

Each of the two cavities 110, 112 is a cubic shape and the two cavities 110, 112 are at different orientations to each other. More than two cubic cavities 110, 112 could be provided with further different orientations.

Each cavity 110, 112 has a membrane 114 or other form of sheet material positioned on the internal faces of the cavities 110, 112. The membrane 114 has a plurality of sides 116, each side positioned on an internal face of the cubic cavities 110, 112. Each side 116 has a pressure pad 118 centrally located on each side 116. In each cubic cavity 110, 112 there are six pressure pads 118. The membrane 114 and the pressure pads 118 can be formed of a suitable material such as Mylar or polyester.

Each cavity 110, 112 houses a calibrated spherical object 120 of known mass. In each cavity 110, 112 the spherical object 120 is held in position centrally within the cavity 110, 112 by contact with the pressure pads 118 on each of the sides 116. The pressure pads 118 are disposed between the spherical object 120 and the membrane 114 that lines the cavity 110, 112.

Figure 1B:
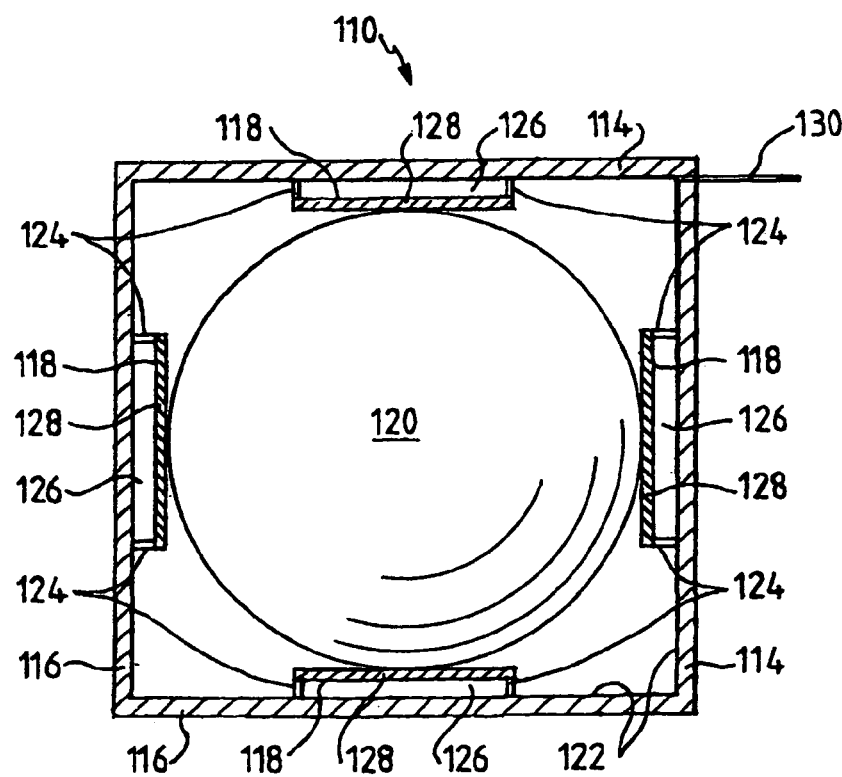
FIG. 1B is a cross-section of a drop detection device in accordance with a preferred embodiment of the present invention.

Referring to FIG. 1B, a cross-section of the components in a single cavity 110 through the center of the cavity 110 is shown. A membrane 114 forms a cubic surround that lines a cavity 110 in a molding. The membrane 114 has six sides 116, with four of the sides 116 shown in the cross-section of FIG. 1B. One side 116 of the membrane has electronic circuitry mounted on it, in the form of a printed circuit board (not shown), such as a circuit 400 depicted in FIG. 4.

Each of the sides 116 has a pressure pad 118 mounted centrally on the inner surface 122 of the membrane 114. The pressure pads 118 are shown in the later figures as being circular, although the pressure pads 118 could be square or any other suitable shape. Each pressure pad 118 is mounted on the inner surface 122 of a side 116 of the membrane 114 on mountings 124 which mount the pressure pad 118 a spaced distance 126 from the inner surface 122 of the membrane 114.

The pressure pads 118 are formed of an elastic conductive diaphragm 128 which may be a plastic material. A predetermined force x is required to deform the diaphragm 128 sufficiently toward the membrane 114 for the diaphragm 128 of the pressure pad 118 to contact the inner surface 122 of the membrane 114. At rest or during normal motion, the spherical object 120 contacts the pressure pads 118 but does not deform the diaphragm 128 of the pressure pad 118 sufficiently for the diaphragm 128 to contact the inner surface 122 of the membrane 114.

The predetermined force x is dependent on a number of parameters, including the flexibility of the diaphragm 128 which is dependent on its material and thickness, the spaced distance 126 between the diaphragm 128 and the membrane 114, and the mass of the spherical object 120. These parameters can be pre-set to provide a predetermined sensitivity of the drop detection device 100.

Many constructions of suitable pressure pads 118 could be used, all using the deforming of a surface with a force. For example, keyboard technology uses such pressure pads.

The inner surface 122 of each side 116 has a membrane 114 disposed opposite the deformable diaphragm 128 of the pressure pad 118, has a contact component connected to the electronic circuitry disposed on one of the sides 116. The contact component, when contacted by the deformed diaphragm 128 of the pressure pad 118, promotes a signal from the electronic circuitry. The electronic circuitry on the side 116 of the membrane 114 is extended out of the cavity 110 in which the membrane 114 is disposed, by means of connectors 130 to a separate electronic circuit from which the signal can be emitted. Alternatively, connectors 130 may be a pair of wires, with one wire attached to membrane 114 and the other wire attached to inner surface 122, such that contacting membrane 114 to inner surface 122 results in a closing of a switch, such as depicted as contact pads 408 in FIG. 4 discussed below.

Figure 2A:
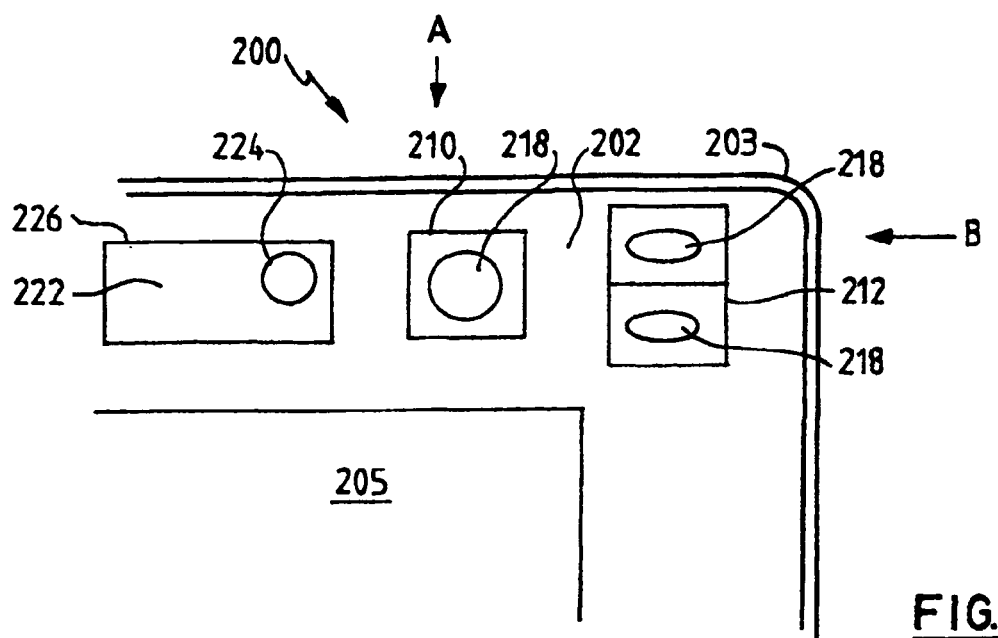
FIG. 2A is a transparent plan view of a drop detection device in accordance with a preferred embodiment of the present invention.
Figure 2B:
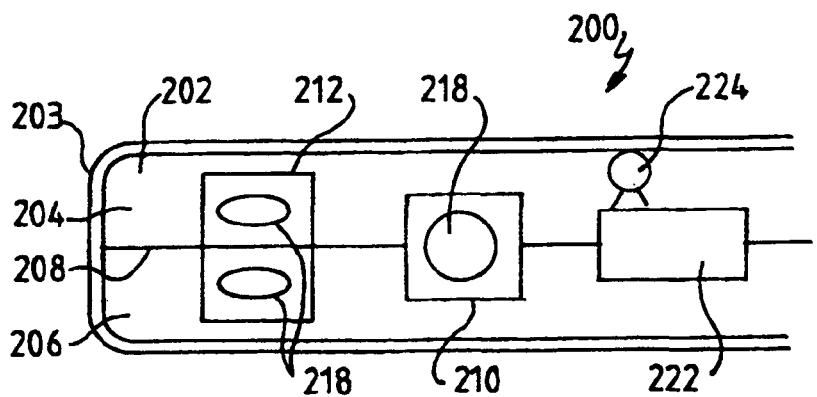
FIG. 2B is a transparent side view of the drop detection device of FIG. 2A in direction A.
Figure 2C:
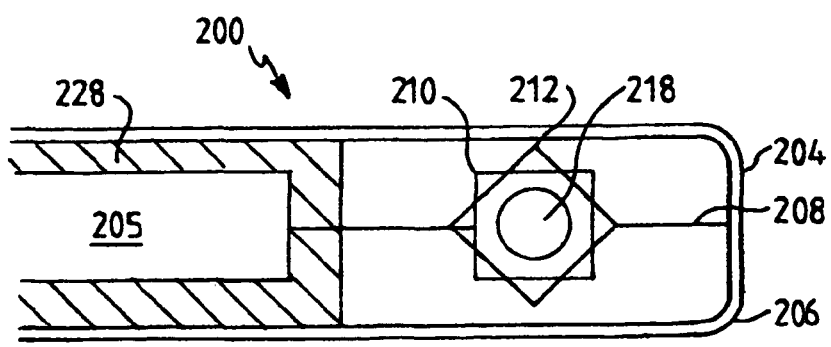
FIG. 2C is a transparent side view of the drop detection device of FIG. 2A in direction B.

Referring to FIGS. 2A, 2B and 2C, a drop detection device 200 is shown incorporated into a molded cassette 202 of a computer. Two cavities 210, 212 are provided of the form shown in FIGS. 1A and 1B. FIG. 2A is a plan view of a corner 203 of the molded cassette 202. The molded cassette 202 surrounds a data file or a hard disk drive 205. The molded cassette 202 has two halves 204, 206, one on top of the other with the mold split line 208 in a horizontal plane, as seen in FIG. 2B.

The two cavities 210, 212 are formed in the molded cassette 202 near the corner 203. The first cavity 210 is oriented with its top and bottom faces of the cube parallel to the mold split line 208. In FIG. 2A, a top pressure pad 218 of the pressure contact membrane 214 is shown in the first cavity 210. The second cavity 212 is oriented with an edge of the cube uppermost and two pressure pads 218 are shown in the second cavity 212.

A further cavity 226 is provided in the molded cassette 202 housing an electronic circuit 222, which is driven by a pulse from a contact between a pressure pad 218 and a component on the surrounding membrane 214.

The contact components on each side of the membranes 214 in each cavity 210, 212 are connected to electronic circuitry on one side of a membrane 214 in each cavity 210, 212 and the circuitry is extended out to the electronic circuit 222 in the separate cavity 226 and connected by a solder reflow joint. Where there is more than one cavity 210, 212, the electronic circuitry in each cavity is connected to the electronic circuit 222 in the separate cavity 226.

The electronic circuit 222 includes an LED 224 which indicates if one of the pressure pads 218 in any one of the cavities 210, 212 has contacted the contact component on the membrane 214 opposite the pressure pad 218.

FIG. 2B is a side view of the arrangement of FIG. 2A from direction A showing the two cavities 210, 212 and the electronic circuit 222 in the additional cavity 226 in the molded cassette 202. The two cavities 210, 212 and the additional cavity 226 for the electronic circuit 222 are formed in the two halves 204, 206 of the cassette molding 202.

FIG. 2C is a side view of the arrangement of FIG. 2A from direction B. This shows the two cavities 210, 212 one in front of the other illustrating their different orientations in the cassette housing 202. The data file or hard disk drive 205 is surrounded by protective foam 228.

Figure 3:
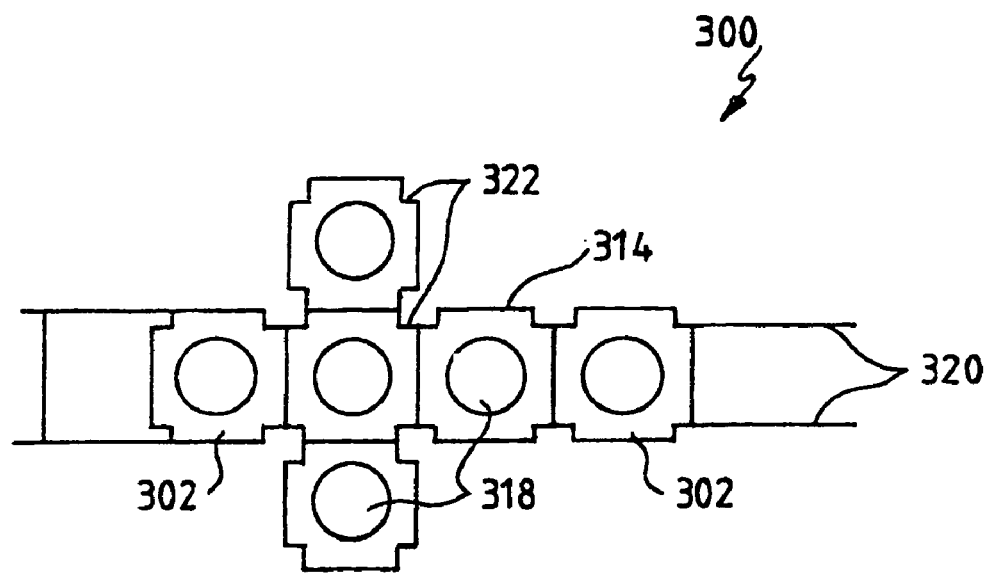
FIG. 3 is a developed profile of a pressure membrane in accordance with a preferred embodiment of the present invention.

Referring to FIG. 3, a developed profile 300 of the membrane 314 is shown. The membrane 314 has six faces 302 corresponding to the six internal faces of each of the cubic cavities 110, 112. Each face 302 has a pressure pad 318, which is circular, and covers as much of each face 302 as possible. The membrane 314 has connectors 320 to connect the membrane 314 to the electronic circuit 222 and LED 224. The corners 322 of each face 302 are cut away for ease of assembly.

Figure 4:
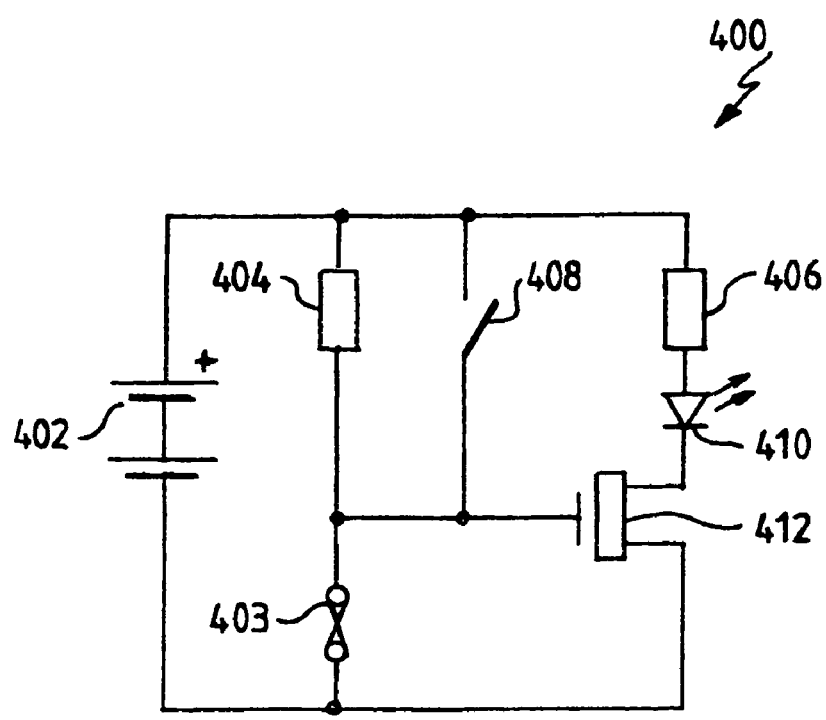
FIG. 4 is a circuit diagram for use in a drop detection device in accordance with a preferred embodiment of the present invention.

The electronic circuit 222 is shown in more detail in FIG. 4. The circuit 400 has a battery 402, a fuse 403, first and second resistors 404, 406, contact pads 408, and an LED 410 and a transistor 412. The contact pads 408 are the diaphragm 128 of the pressure pad 118 and the contact component of the membrane 114 shown in FIG. 1B. When the contact pads 408 are open, the current from the battery 402 passes through the first resistor 404 and the fuse 403 without blowing the fuse 403. The contact pads 408 are closed when a pressure pad 118 of the membrane 114 is activated. This causes the fuse 403 to be blown as the current from the battery 402 bypasses the first resistor 404.

Once the fuse 403 has been blown, the transistor 412 operates and the battery 402 powers the LED 410 via the second resistor 406 resulting in an illuminated LED 410. As an alternative arrangement, a flashing LED or an audible alarm could be used in place of the LED.

In practice, a drop detection device 100, 200 as described is provided in a molded housing 102, 202 of a product, such as a computer, or in packaging surrounding a fragile object. Alternatively, the drop detection device 100, 200 is provided as a self-contained assembly. If the object is dropped or impacts with another object, the object will accelerate and/or decelerate very quickly.

Sudden acceleration causes the spherical objects 120, which act as inertia bodies, to exert a force on the pressure pads 118, 218 in the opposite direction to the direction of acceleration. Deceleration causes the spherical objects 120 in the cavities 110, 112, 210, 212 to exert a force on the pressure pads 118, 218 of the membrane 114, 214 in the direction in which the object was traveling before the impact.

When a pressure pad 118, 218 has had a force exerted on it by the spherical object 120 above a predetermined force x, the pressure pad 118, 218 is deformed sufficiently to contact the membrane 114 and activate a switch in an electronic circuit 222 in the molded housing 102, 202 which turns an LED 402 to an ON state.

The mass of the calibrated spherical objects 120 can be tuned to give the required sensitivity by altering the predetermined force x required to activate the drop detection device 100, 200 and therefore changing the specification of protection. As an example, ball bearings could be used as the spherical objects 120.

Due to the different orientations of the two cubic cavities 110, 112, 210, 212, impact in a plurality of different directions can be detected. This provides detection of a drop or impact in directions of approximately 360°. Two cavities have been illustrated; however, more than two cubic cavities could be used, for example four cubic cavities could be used in different orientations. Also, the cavities do not need to be cubic. Cavities with more than six faces could be used, for example in the form of octahedrons, etc.

While the invention has been particularly shown and described with reference to a preferred embodiment, it will be understood by those skilled in the art that various changes in form and detail may be made therein without departing from the spirit and scope of the invention.

The invention claimed is:

1. A drop detection device comprising:
a spherical inertia member disposed within an enclosure, the enclosure having a plurality of faces, each face having a pressure contact member, wherein a predetermined amount of force exerted by the spherical inertia member on one of the pressure contact members causes a signal to be activated, and wherein the drop detection device includes a first enclosure and a second enclosure, the first and second enclosures having cube shapes, the second enclosure being adjacent and oriented rotationally offset to the first enclosure, wherein the first enclosure has contact pressure members for detecting any of a first set of orthogonal forces, and the second enclosure has contact pressure members for detecting any of a second set of orthogonal forces, the first and second sets of orthogonal forces being offset to each other.

2. The drop detection device of claim 1, wherein the pressure contact members are formed of a deformable diaphragm proximal to but not touching a contact member, wherein the predetermined amount of force deforms the diaphragm to contact the contact member.

3. The drop detection device of claim 1, wherein the predetermined amount of force is determined by a mass of the spherical inertia member.

4. The drop detection device of claim 2, wherein the predetermined amount of force is determined by a flexibility of the deformable diaphragm and a distance between the deformable diaphragm and the contact member.

5. The drop detection device of claim 1, wherein in a rest position or during normal motion, the spherical inertia member rests in contact with the contact pressure members on the faces exerting a force of less than the predetermined amount of force on the pressure contact members.

6. The drop detection device of claim 1, wherein the enclosure is formed by two molded halves of a housing.

7. The drop detection device of claim 1, wherein the spherical inertia member is calibrated to a predetermined mass in relation to the required sensitivity of the drop detection device to result in a signal being generated upon a pre-determined drop force being exerted on the drop detection device.

8. The drop detection device of claim 1, wherein the pressure contact members are contact keys.

9. The drop detection device of claim 1, wherein the signal activates a visual indicator.

10. The drop detection device of claim 9, wherein the visual indicator is an LED (Light Emitting Diode).

11. The drop detection device of claim 1, wherein the signal activates an aural indicator.

12. The drop detection device of claim 11, wherein the aural indicator is an audible alarm.

13. The drop detection device of claim 1, wherein the drop detection device is formed during the molding of a computer product.

14. The drop detection device of claim 1, wherein the drop detection device is a self-contained assembly or is molded into packaging for products.

15. A drop detection device comprising:
a spherical inertia member disposed within an enclosure, the enclosure having a plurality of faces, each face having a pressure contact member, wherein a predetermined amount of force exerted by the spherical inertia member on one of the pressure contact members causes a signal to be activated, wherein the signal activates an alarm indicator in an electronic circuit, the electronic circuit comprising:

a battery having a first terminal and a second terminal;

a first resistor coupled to the first terminal of the battery;

a fuse coupling in series the first resistor to the second terminal of the battery;

a second resistor coupled to the first terminal of the battery;

an alarm indicator coupling in series the second resister to a transistor, and the transistor coupling in series the alarm indicator to the second terminal of the battery; and a contact having a first contact end and a second contact end, the first contact end being coupled to the first terminal of the battery and the second contact end being coupled to the fuse, wherein if the contact remains open by keeping separate the first and second contact ends, then no current from the battery passes through the alarm indicator, and wherein if a pre-determined drop force is exerted on the drop detection device, then the contact closes, resulting in the fuse being blown by current from the battery, such that current then flows through the alarm indicator.

16. The drop detection device of claim 15, wherein the alarm indicator is a Light Emitting Diode (LED).

* * * * *